US006969976B1

(12) United States Patent
Broach et al.

(10) Patent No.: US 6,969,976 B1
(45) Date of Patent: Nov. 29, 2005

(54) DYNAMIC CURRENT LIMIT ADJUSTMENTS (75) Inventors: Michael Eugene Broach, San Mateo, CA (US); Frank John De Stasi, San Leandro, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/861,872

(22) Filed: Jun. 4, 2004

Related U.S. Application Data (63) Continuation-in-part of application No. 10/703,960, filed on Nov. 7, 2003.

(51) Int. Cl.[7] ............................ G05F 1/10; G05F 1/656

(52) U.S. Cl. ...................... 323/222; 323/284; 323/901

(58) Field of Search ................................. 323/901, 908, 323/222, 223, 284, 282

(56) References Cited

U.S. PATENT DOCUMENTS

| | | | | |
|---|---|---|---|---|
| 4,127,894 A | | 11/1978 | Bishop et al. ................. 363/56 |
| 4,403,279 A | * | 9/1983 | Hirsch et al. ................. 323/222 |
| 4,439,822 A | | 3/1984 | Cocconi ....................... 363/56 |
| 6,282,102 B1 | | 8/2001 | Minamisawa et al. ........ 363/16 |
| RE37,609 E | * | 3/2002 | Bittner ........................ 323/272 |
| 6,492,794 B2 | * | 12/2002 | Hwang ......................... 323/285 |
| 6,671,143 B2 | * | 12/2003 | Hwang ......................... 323/278 |
| 6,737,845 B2 | * | 5/2004 | Hwang ......................... 323/284 |

OTHER PUBLICATIONS

Ronald I. Birdsall, "Proceedings of Powercon7," *Power Concepts, Inc.*, Mar. 24-27, 1980 (12 pages).
"LM2621 Low Input Voltage, Step-Up DC-DC Converter," *National Semiconductor Corporation*, Feb., 2000 (10 pages).
"LM78S40 Switching Voltage Regulator Applications," *National Semiconductor Corporation*, Mar., 2000 (17 pages).
"Wide-Input, High Voltage Buck Converter," *National Semiconductor Corporation*, Sep., 2002 (3 pages).
"Introduction to Power Supplies," *National Semiconductor Corporation*, Sep., 2002 (7 pages).
"Modelling, Analysis and Compensation of the Current-Mode Converter," *Unitrode Corporation* (6 pages).
"UC3842/3/4/5 Provides Low-Cost Current-Mode Control," *Unitrode Corporation* (14 pages).

* cited by examiner

*Primary Examiner*—Bao Q. Vu
(74) *Attorney, Agent, or Firm*—Merchant & Gould; Brett A. Hertzberg (57) ABSTRACT

A system, method, and apparatus are arranged to provide for current limit adjustments in a switching regulator that includes an inductor. A switched voltage divider circuit is selectively activated according to the actuation of various switching circuits in the regulator. The output of the switched voltage divider circuit is compared to a reference signal from a reference circuit to determine when a current limit is reached. At least one of the voltage divider ratio and the reference signal is adjustable in response to measurements related to the inductor saturation such that the current limit is changed to match inductor characteristics.

20 Claims, 9 Drawing Sheets

DYNAMIC CURRENT LIMIT ADJUSTMENTS

CROSS REFERENCE TO RELATED APPLICATIONS

This patent application is a continuation-in-part of U.S. patent application Ser. No. 10/703,960, which was filed Nov. 7, 2003, and claims the benefit under 35 U.S.C. 120 of the filing date.

FIELD OF THE INVENTION

The present invention relates to a system and method for adaptively adjusting the current limit in a switching regulator such as a buck regulator, a boost regulator, or a buck-boost regulator. A measurement system and method is employed to measure saturation points in an inductor of the regulator. The current limit can be adjusted such that saturation of the inductor is prevented.

BACKGROUND OF THE INVENTION

Opposite polarity pulses can be applied to a transformer in a pulse-width-modulated (PWM) power converter. The secondary winding of the transformer is connected to additional circuitry such as a passive filter to generate an average output voltage. The average output voltage is related to the pulse-width by the volts-seconds rule and the characteristics of the transformer.

Figure 1:
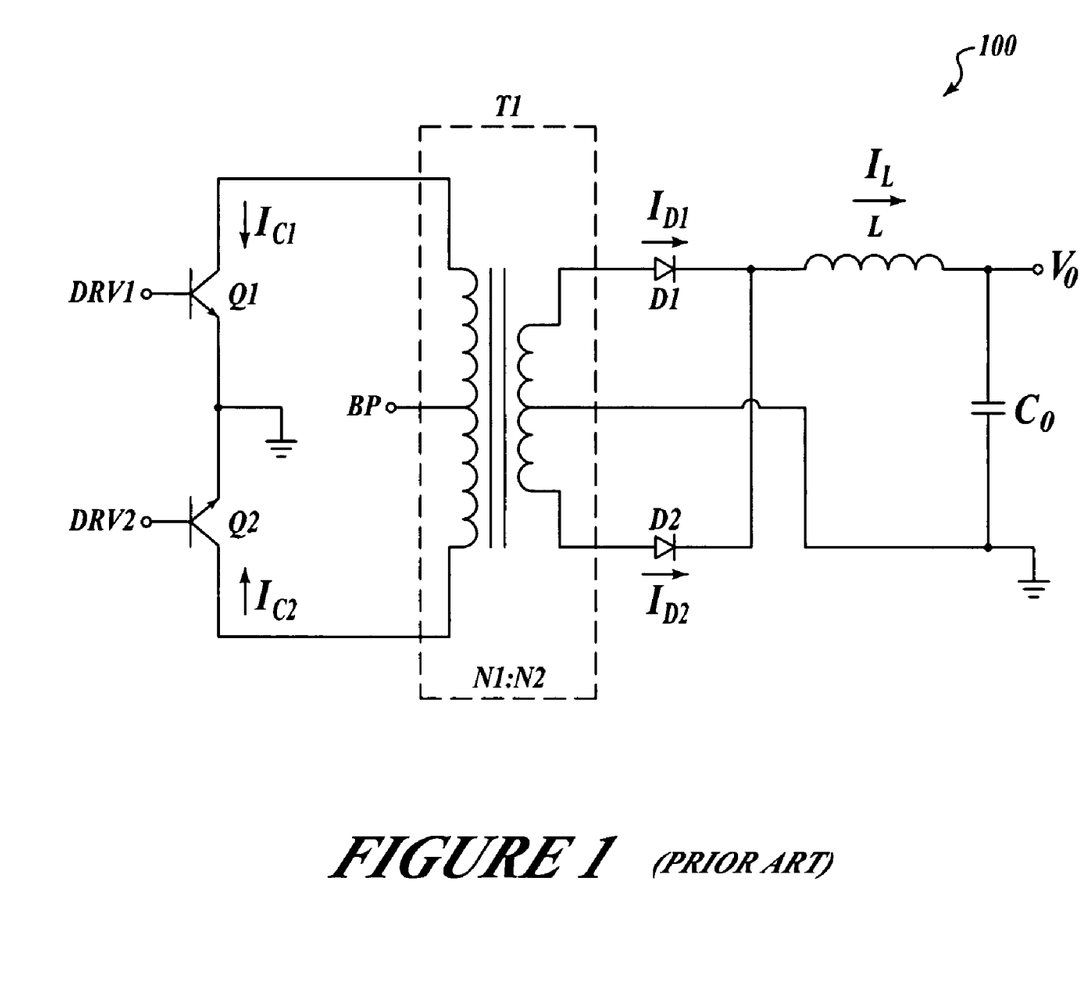
FIG. 1 is an illustration of a conventional push-pull type PWM converter.

An example push-pull type PWM converter is illustrated in FIG. 1. As illustrated in FIG. 1, transformer T1 conducts current (IC1, IC2) from the BP power supply terminal through transistors Q1 and Q2. For example, the primary winding of transformer T1 conducts current IC1 when transistor Q1 is activated, while the primary winding of transformer T1 conducts current IC2 when transistor Q2 is activated. Diodes D1 and D2 operate on opposite polarity cycles to provide current (either ID1 or ID2) through inductor L to a load (not shown). Capacitor C0 is filter ripple in the output voltage (VO).

Ideally, transistors Q1 and Q2 are activated for equal amounts of time via drive signals DRV1 and DRV2 such that the volt-second integral of the pulses applied to the transformer corresponds to zero and the transformer core does not saturate. However, non-ideal switching times for transistors Q1 and Q2 may result in unequal cycle times such that the transformer core is driven into saturation. Core saturation in a PWM converter may result in secondary effects such as breakdown in the switching transistors (Q1, Q2), excessive voltage and current stress on the rectifier diodes (D1, D2), as well as EMI related problems.

BRIEF DESCRIPTION OF THE DRAWINGS

Non-limiting and non-exhaustive embodiments of the present invention are described with reference to the following drawings.

DETAILED DESCRIPTION OF THE PREFERRED EMBODIMENT

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to a system, method, and apparatus for providing current limit adjustment in a switching regulator that includes an inductor. A switched voltage divider circuit is selectively activated according to the actuation of various switching circuits in the regulator. The output of the switched voltage divider circuit is compared to a reference signal from a reference circuit to determine when a current limit is reached. At least one of the voltage divider ratio and the reference signal is adjustable in response to measurements related to the inductor saturation such that the current limit is changed to match inductor characteristics.

Measured Inductor Characteristics

Inductors in switching electronic circuits are typically made out of ferrites or some other core material that has a higher permeability than air. Unlike air core inductors, the amount of current flowing in these inductors is constrained by the quality and quantity of the core material. Once the inductor's operating current exceeds a saturation point, the inductor's effectiveness is reduced and the rate of increase in the current relative to the applied voltage rises measurably.

The inductor voltage ($V_L$) and the inductor current ($I_L$) are related to one another by: $\Delta I_L/\Delta t = \Delta V_L/L$.

Magnetic load applications such as motor drivers and switched-mode power supplied (SMPS) incorporate current limiting circuits to protect the control circuits (e.g., drivers, inductive elements, etc.) from currents that are sufficient to cause saturation and induce destructive currents. For example, in a SMPS the saturation current should always be greater than the current limit in the controller.

The various measurements of voltages and/or currents can be used to calculate values of characteristics associated with the inductor. Example characteristics include: inductor value, series resistance, slew rate in non-saturation, slew rate in saturation, as well as others. Inductors with different core materials have different characteristic curves (e.g., the saturation and non-saturation slew rates change based on the type of core material) such that the type of core material and the value of the inductor can be determined (e.g., a lookup table that identifies the core material type based on characteristic measurements). The characteristic measurements can also be used in a control system such as in a switching-type converter (or regulator) to adaptively change control parameters such as: current limit, switching time, small signal compensation, and slope compensation.

Conventional circuits often include a current limit to prevent undesirable effects such as a short circuit, or protection from some other event that may damage various portions of the circuit. In the present invention, characteristics associated with the inductor are measured and various control parameters associated with current limit of the circuit are dynamically adjusted by the control circuit to accommodate a wide range of inductor values and saturation ratings. In one example, additional current sources are enabled/disabled to change a reference voltage associated with the current limit. In another example, voltage divider ratios are adjusted to change a feedback voltage associated with the current limit. In still another example, both reference voltages and feedback voltages may be adjusted to change the current limit in the circuit.

Figure 2:
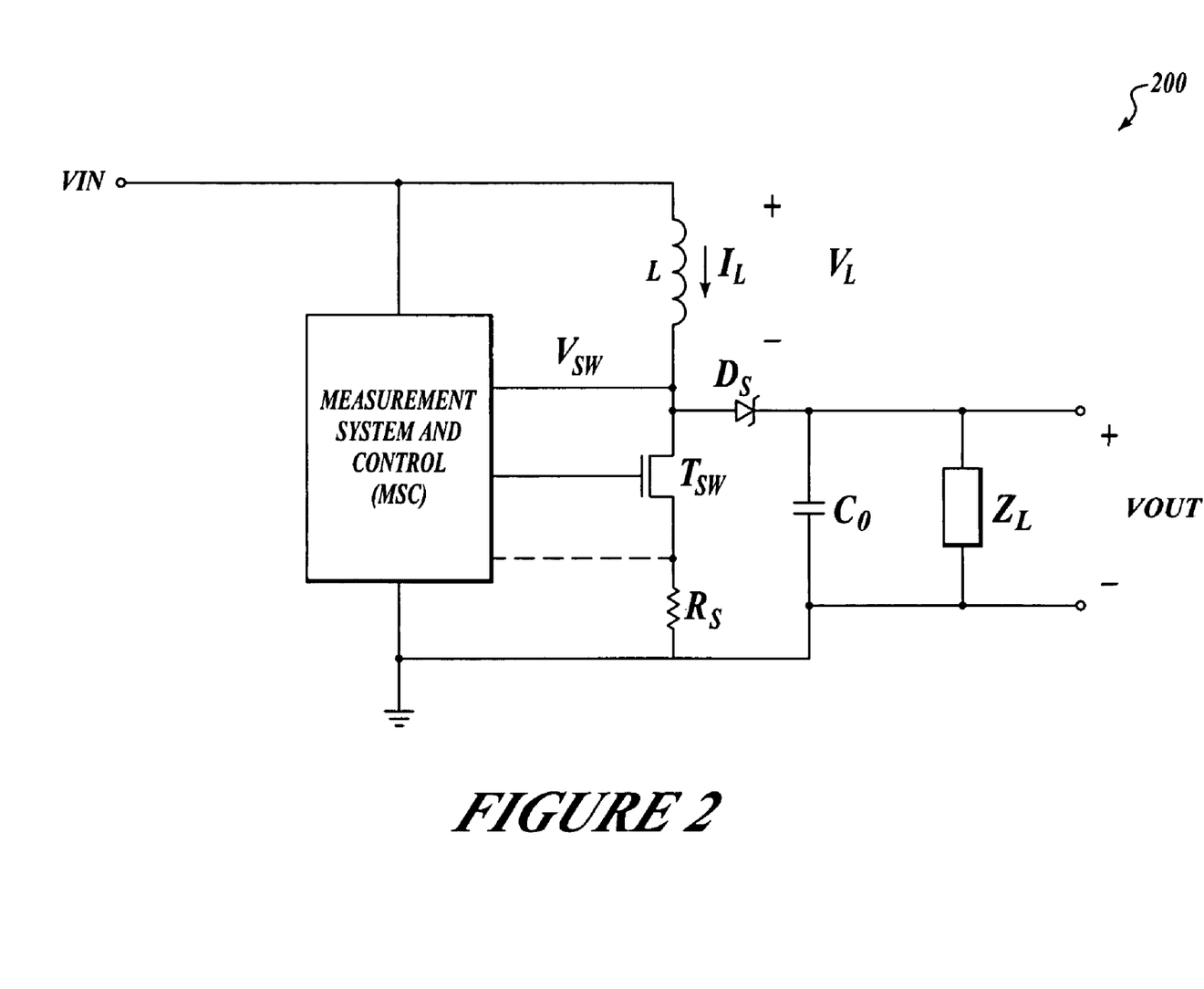
FIG. 2 is an illustration of an example embodiment of a switching converter.

FIG. 2 is an illustration of an example embodiment of a switching converter (200) that is arranged according to an aspect of the present invention. Switching converter 200 includes an inductor (L), a switching transistor ($T_{SW}$), a diode ($D_S$), a capacitor ($C_O$), a load circuit ($Z_L$), and a measurement and system control (MSC) block.

Inductor L is charged when switching transistor $T_{SW}$ is active. Inductor current ($I_L$) is delivered to capacitor $C_O$ and load circuit $Z_L$ via diode $D_S$ when transistor $T_{SW}$ is inactive. In a normal operating mode, the MSC block is arranged to actuate switching transistor $T_{SW}$ such that inductor L is periodically charged. The MSC block is further arranged to monitor the voltages and currents associated with inductor L when the switching converter 200 is operated in a measurement mode, and provides a measurement of the inductance value based on those measurements.

The change in inductor voltage ($\Delta V_L$) is determined by monitoring the input voltage ($V_{IN}$) and the switch voltage ($V_{SW}$). In one example embodiment, the change in inductor current ($\Delta I_L/\Delta t$) is determined by monitoring the change in voltage across the switching transistor ($\Delta V_{DS}$) and calculating: ($\Delta I_L/\Delta t$)=($\Delta V_{DS}/\Delta t$)/rdson, where rdson is the on resistance of switching transistor $T_{SW}$. An optional resistor ($R_S$) may be placed in series with switching transistor $T_{SW}$ to facilitate measurement of the inductor current.

Figure 3:
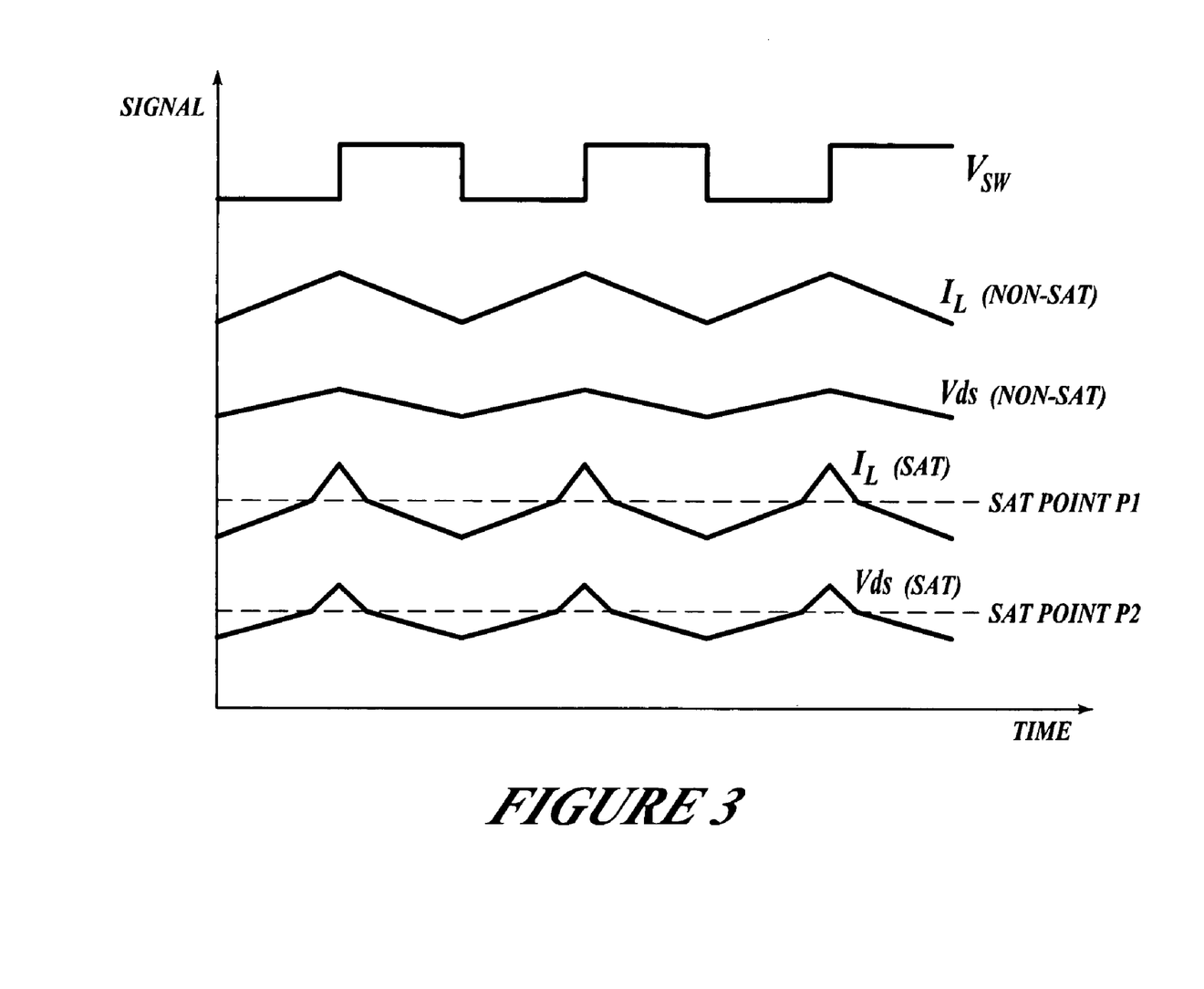
FIG. 3 is an illustration of example waveforms for a switching converter.

FIG. 3 is an illustration of example waveforms for a switching converter such as that illustrated in FIG. 2. Ideally, the inductor does not reach a saturation point and the inductor current ($I_L$) and the voltage across transistor $T_{SW}$ ($V_{DS}$) changes linearly in proportion to the value of the inductor. The non-ideal effects of inductor saturation are also illustrated as the inductor current (IL) and the voltage across transistor TSW ($V_{DS}$) experience a measurable change in slope when the saturation points ($P_1$ and $P_2$) are reached. The voltage across resistor $R_S$ (when found in circuit 200) has the same shape as $V_{DS}$.

Figure 4:
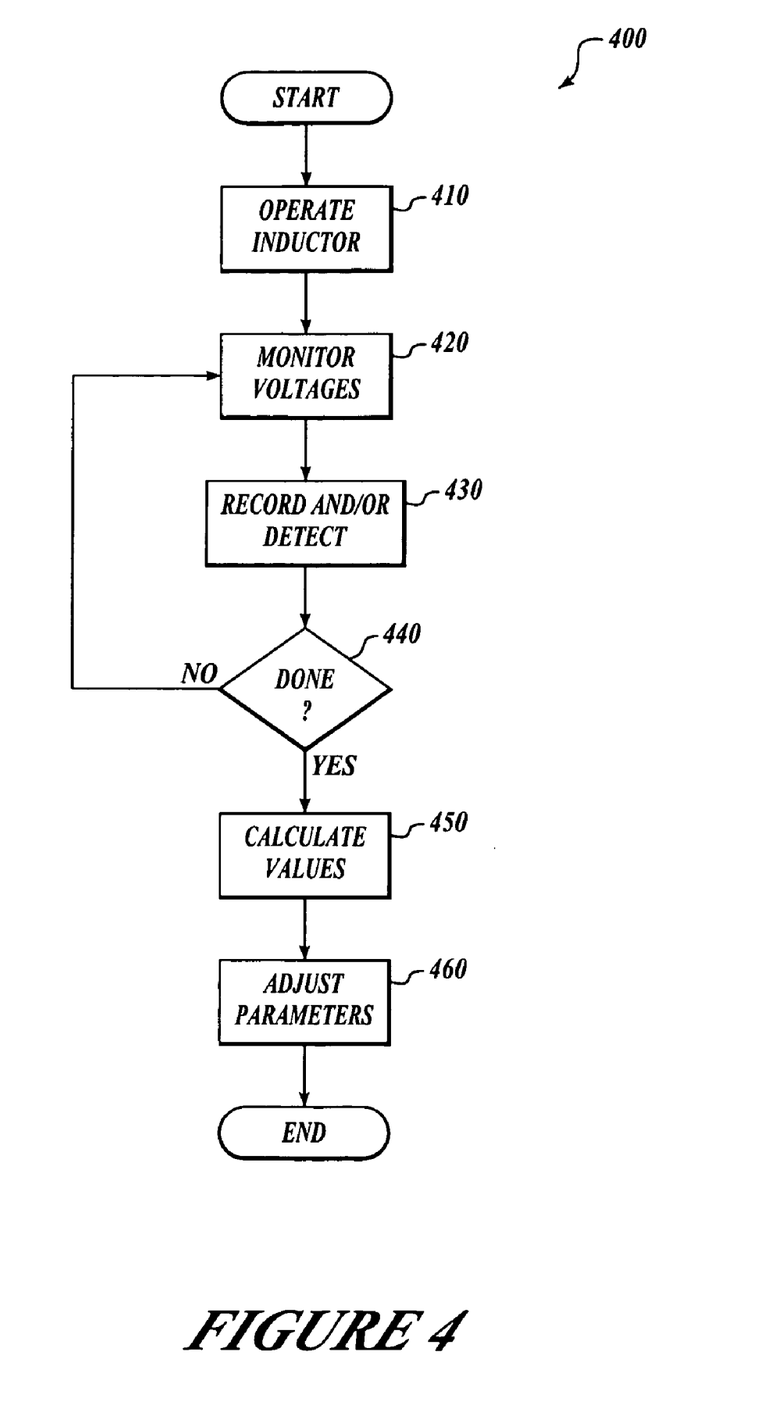
FIG. 4 is an illustration of a procedural flow for an example measurement system.

FIG. 4 is an illustration of a procedural flow for an example measurement system that is arranged according to an aspect of the present invention. After the measurement mode is activated by some triggering event, processing continues at block 410 where the inductor is operated for one or more cycles. At block 420, voltages (e.g., $V_{IN}$, $V_{SW}$, $V_{DS}$, $V_{RS}$, etc.) associated with the inductor are monitored (420) while the inductor is operated. At block 430, the monitored voltages are recorded and/or used to detect the saturation point (depending on the circuit implementation). From decision block 440, the process returns to block 420 when additional monitoring is necessary. Processing continues to block 450 when no additional voltages need be monitored. At block 450, values associated with the inductor (e.g., inductance value, slew rate, saturation point, etc.) are calculated. The calculated values can be used by other circuits or systems to adjust one or more parameters (e.g., small-signal compensation, current limit, slope compensation, etc).

In one example, voltages are monitored by an analog-type circuit that detects the slope associated with the current and/or voltage associated with the inductor. In another example, the inductor voltages and/or currents are monitored by an analog-to-digital converter. In this example, either the digital values can be recorded in a memory and later retrieved for calculation purposes, or the digital values can be evaluated in real time. In a further example, the digital values can be processed (e.g., averaged, throwing out extreme values, filtered, etc.) over many operating cycles of the inductor to minimize the effects of noise and switching transients on the measurement values. The processing of the digital values can be provided as a post-processing function or in real-time based on the processing power of the system implementation.

Figure 5:
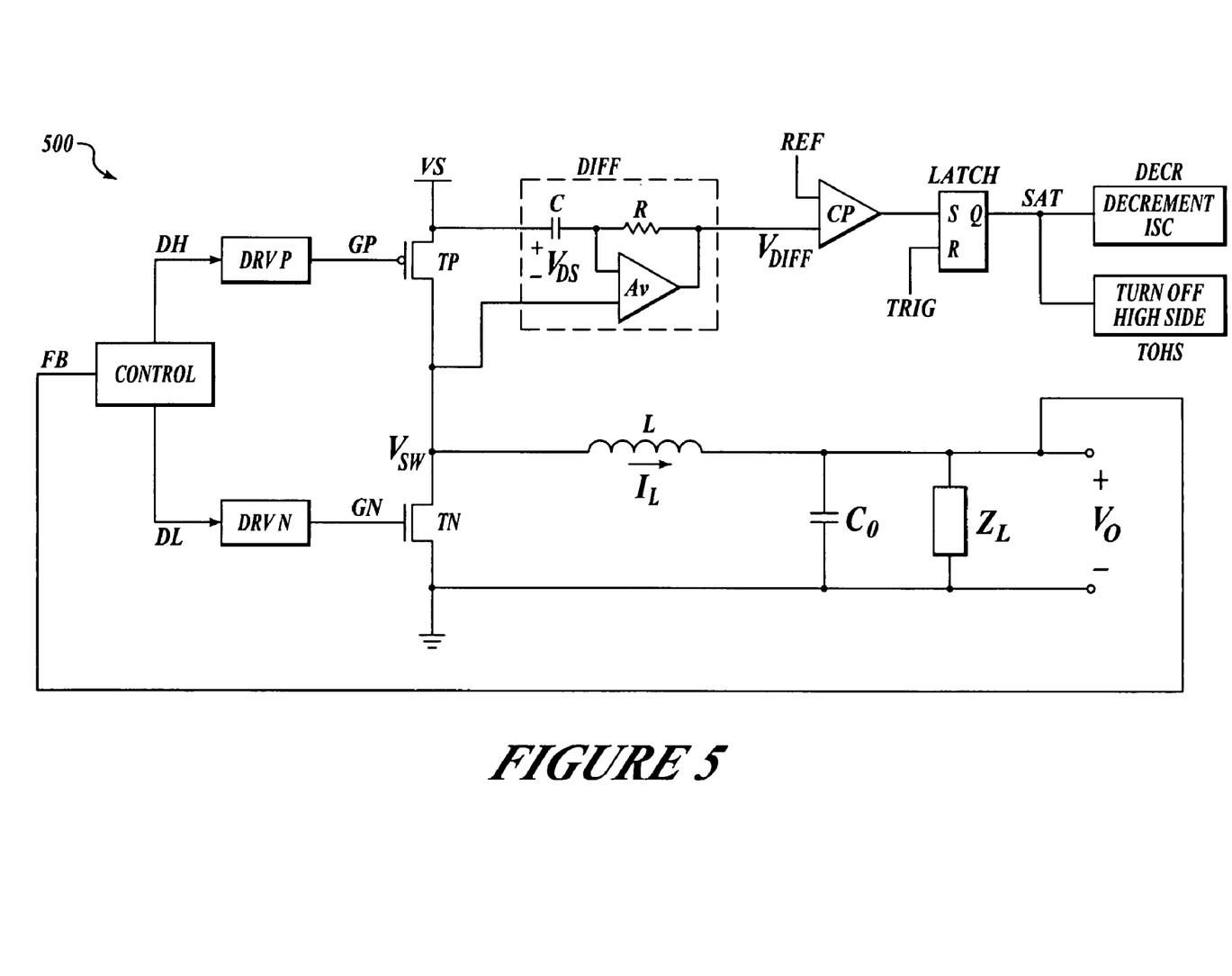
FIG. 5 illustrates another example embodiment of a switching converter with analog differentiator processing system.

FIG. 5 illustrates another example embodiment of a switching converter (500) that is arranged in accordance with an aspect of the present invention. Switching converter 500 is buck-type converter that includes a p-type transistor ($T_P$), an n-type transistor ($T_N$), drivers ($DRV_P$, $DRV_N$), a controller (CNTL), a differentiator (DIFF), a comparator (CP), an SR-type latch (LATCH), a decrement circuit (DECR), a high-side turn-off circuit (TOHS), an inductor (L), a capacitor ($C_O$), and a load circuit ($Z_L$).

The controller (CNTL) is arranged to provide drive signals $D_H$ and $D_L$ to drivers $DRV_P$ and $DRV_N$, respectively. Driver DRVP provides a gate control signal ($G_P$) to p-type transistor $T_P$, while driver DRVN provides another gate control signal ($G_N$) to n-type transistor $T_N$. The p-type transistor ($T_P$) is arranged to operate as a high side switch that couples the inductor (L) to the high power source ($V_S$). The n-type transistor ($T_N$) is arranged to operate as a low side switch that couples the inductor (L) to the low power source (GND). Capacitor $C_O$ is coupled in parallel with load circuit $Z_L$, which provides a feedback signal (FB) from $V_O$ to the controller (CNTL).

An example differentiator illustrated in FIG. 5 includes a capacitor (C), a resistor (R), and an amplifier ($A_V$). The differentiator is arranged to monitor the drain-source voltage ($V_{DS}$) of p-type transistor $T_P$ and provide a signal ($V_{DIFF}$)

that is proportional to $\Delta V_{DS}/\Delta t$. The signal ($V_{DIFF}$) is used to adjust parameters within the circuit such as, for example, small-signal compensation, slope compensation, and current limit.

Figure 6:
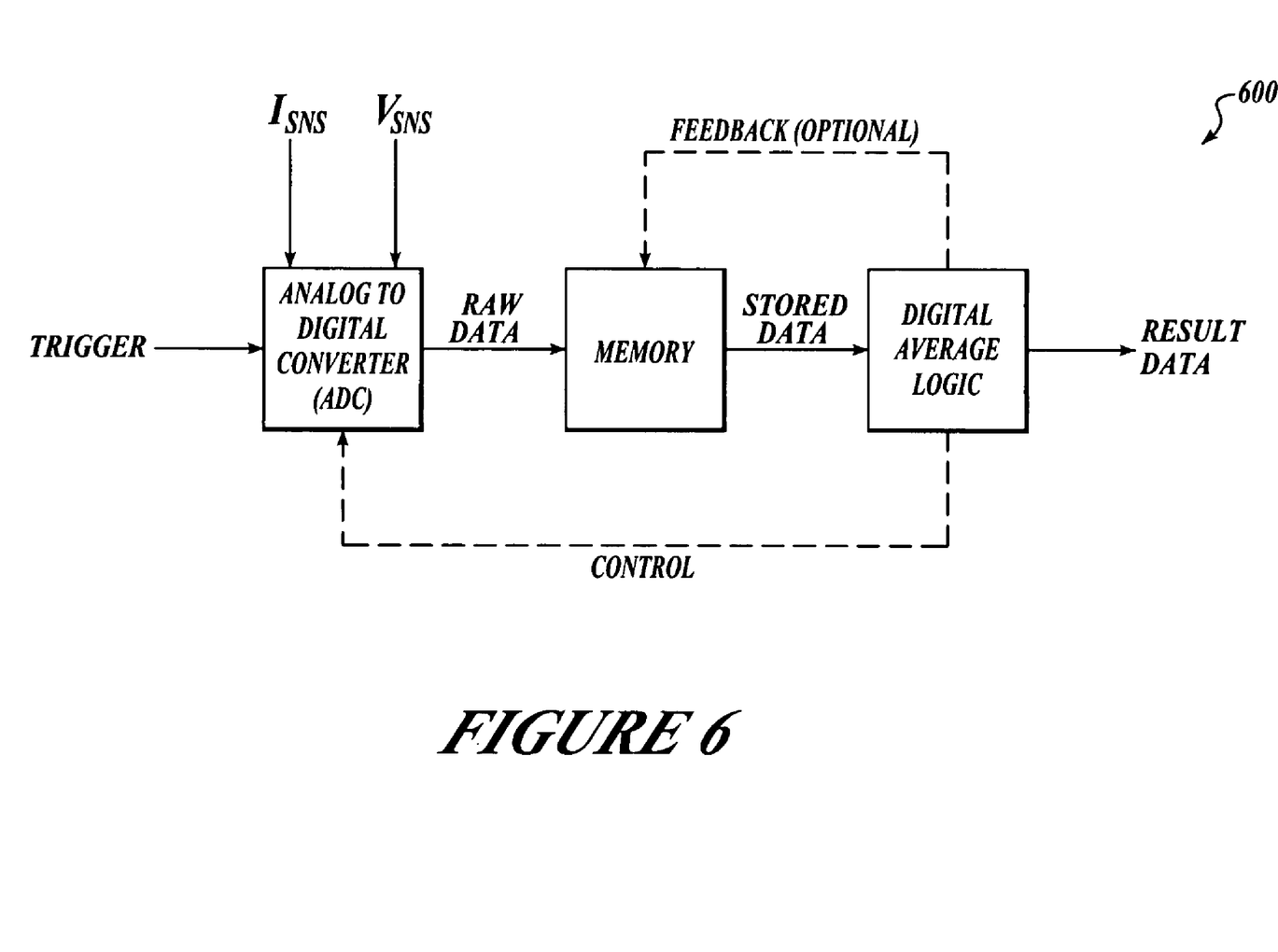
FIG. 6 illustrates an example of a digital processing circuit.

FIG. 6 illustrates an example of a digital processing circuit (600) that is arranged in accordance with aspects of the present invention. The digital processing circuit (600) includes an analog-to-digital converter (ADC) circuit, a memory circuit, and a digital processing logic (DPL) circuit. The ADC circuit is activated by a trigger mechanism (TRIGG) and converts a series of measurement signals (ISNS, VSNS, etc) to a data stream (raw data). The data stream is received by the memory circuit for storage. Data in the memory circuit can be retrieved by the DPL circuit for further processing.

In one example, the memory circuit stores sampled data points that are utilized to find the value of $\Delta V_{DS}/\Delta t$, where the DPL circuit is arranged to calculate the value after all of the sampled points are stored. In another example, the memory circuit stores values that correspond to an average value, and the DPL circuit calculates a running average. The DPL circuit can further be arranged to: locate the saturation point of the inductor, calculate the slope of the inductor current, filter noise from the sampled data, discard anomalous data from the sampled data points, determine an appropriate current limit, determine a slope compensation parameter(s), determine a small-signal compensation parameter(s), as well as provide other calculations.

Dynamic Current Limit Adjustment Generally

Figure 7:
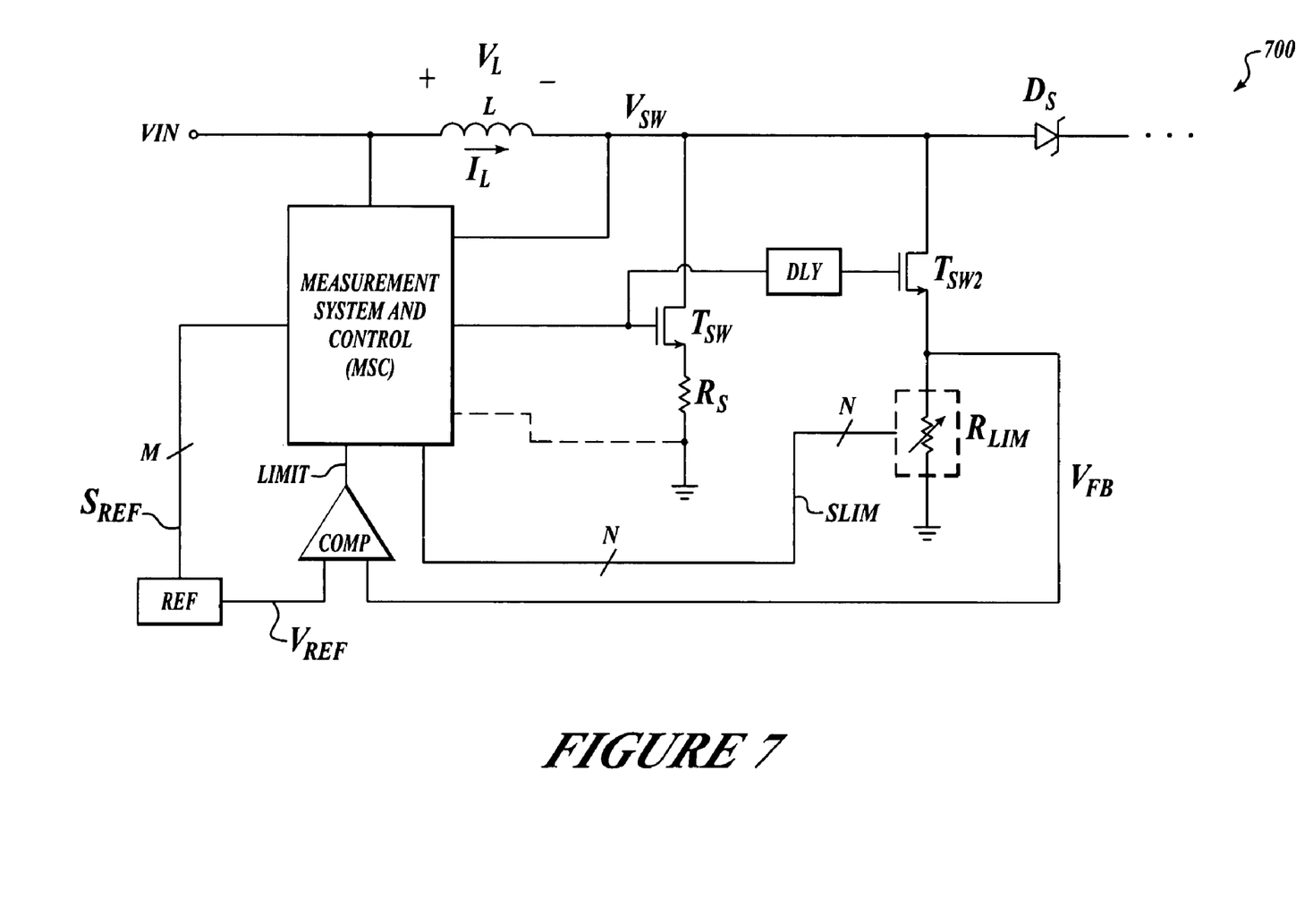
FIG. 7 illustrates an example regulator system that includes a dynamic current limit adjustment.

FIG. 7 illustrates an example regulator system (700) that includes a dynamic current limit adjustment that is arranged according to at least one aspect of the present invention. System 700 includes an inductor (L), two switching transistors ($T_{SW}$, $T_{SW2}$), a diode ($D_S$), a reference circuit (REF), a comparator (COMP), an adjustable resistance circuit ($R_{LIM}$), an optional delay circuit (DLY), and a measurement and system control (MSC) block.

The system (700) illustrated in FIG. 7 is substantially similar in operation to that described with respect to FIG. 2, and like components are labeled identically. Delay circuit DLY is responsive to the control signal that is provided to switching transistor $T_{SW}$ and provides another control signal to switching transistor $T_{SW2}$ after a short time delay. Switching transistor $T_{SW2}$ is arranged in cooperation with the adjustable resistance circuit ($R_{LIM}$) to operate as a switched voltage divider that provides a feedback voltage ($V_{FB}$). Resistance circuit $R_{LIM}$ is optionally adjusted in response to a resistance control signal ($S_{LIM}$). Reference circuit REF is arranged to provide a voltage reference ($V_{REF}$), which is optionally adjusted in response to a reference control signal ($S_{REF}$). Comparator COMP is arranged to assert a current limit signal (LIMIT) in response to the comparison between voltage reference $V_{REF}$ and feedback voltage $V_{FB}$.

The measurement system and control (MSC) block is arranged to control the switching of transistor $T_{SW}$ as previously described with respect to FIG. 2. The MSC block is also arranged to adjust the current limit by adjusting at least one of the reference voltage ($V_{REF}$) and the level associated with the feedback voltage ($V_{FB}$). The amount of the feedback voltage is related to the voltage at the switch terminal (SW), the drain-to-source voltage of switching transistor $T_{SW2}$, the value associated with adjustable resistance circuit $R_{LIM}$, and the inductor current ($I_L$). Control signal SLIM is provided by the MSC block such that the resistance level associated with resistance circuit RLIM can be changed. Control signal SREF is also provided by the MSC block such that the voltage associated with the reference circuit can be changed.

The current limit may be adjusted to account for certain non-ideal effects in the overall system, including but not limited to, avoiding saturation of the core material in the inductor. For example, the MSC block may be configured to measure the current level associated with the inductor for which the core is detected as saturating (see previous discussions). After the current level is measured, the MSC block may then adjust at least one of the reference voltage ($V_{REF}$) and the feedback voltage ($V_{FB}$) so that the current limit level is reduced and core saturation is avoided during operation of the system. The process of adjusting the current limit in the system (700) can be performed a single time, periodically, after the occurrence of a detected event, or continually.

Dynamic Current Limit with Adjustable Feedback Voltage Level

Figure 8:
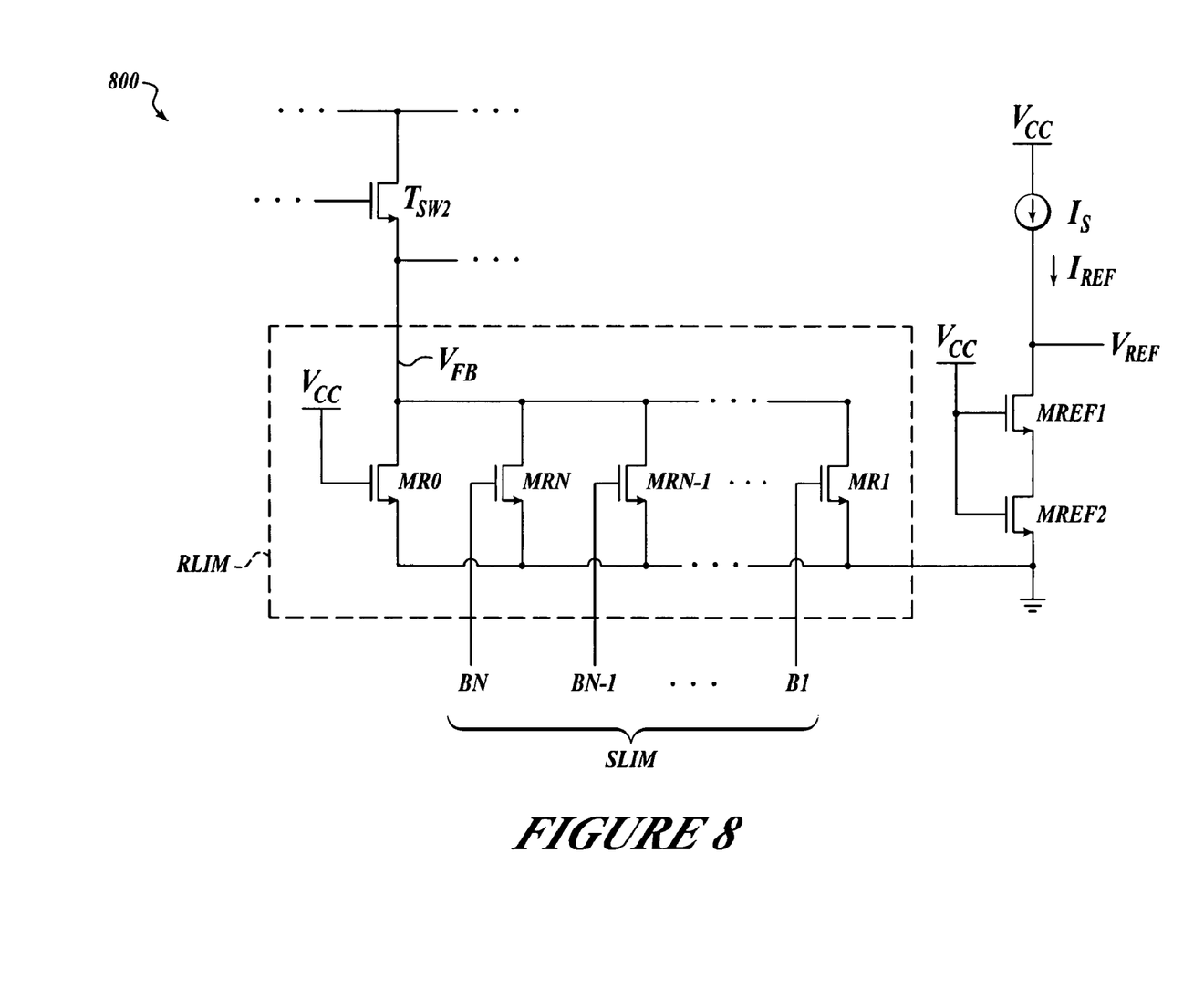
FIG. 8 illustrates an example schematic diagram for a system that employs a first current limit adjustment means.

FIG. 8 illustrates an example schematic diagram for a system (800) that employs a first current limit adjustment means that is arranged according to at least one aspect of the present invention. System 800 includes a switching transistors ($T_{SW2}$), an adjustable resistance circuit ($R_{LIM}$), and a reference circuit (REF) that is illustrated by a two transistors ($M_{REF1}$, $M_{REF2}$) and a current source ($I_S$).

The system (800) illustrated in FIG. 8 is substantially similar in operation to that is described with respect to FIG. 7, and like components are labeled identically. Adjustable resistance circuit $R_{LIM}$ includes an array of N selectable transistors ($M_{R1}$–$M_{RN}$), and a transistor $M_{R0}$ that is always active. The N selectable transistors are configured to operate as switched resistances that are selectively coupled together in parallel with transistor $M_{R0}$. The parallel circuit is coupled to the switching transistor ($T_{SW}$) to operate as a switched voltage divider that can be adjusted in response to a control signal $S_{LIM}$ (e.g., an N-bit signal bus with bits $B_1$–$B_N$).

Each of transistors ($M_{R0}$–$M_{RN}$) has a corresponding drain-source impedance when activated. The parallel combination of all of the active transistors yields an effective resistance that functions as part of the switched voltage divider that was previously described. The effective drain-source impedance of each transistor may be the same as one another, different from one another, ratioed to one-another according to binary values, or arranged to provide a specific set of effective impedances as may be desired. The number of adjustable resistance elements (the transistors) can be changed from 1 to N based on a desired granularity for adjusting the current limit.

In one example, the adjustable resistance elements ($M_{R1}$–$M_{RN}$) are scaled with respect to one another according to binary weighting such that the current limit has an adjustment range of approximately 20%. For example, all of the resistance elements can be initially activated such that the effective impedance is very low and the feedback voltage ($V_{FB}$) is reduced. By selectively deactivating various resistive elements from the parallel circuit, the overall impedance increases and the feedback voltage ($V_{FB}$) will also increase.

Transistors $M_{REF1}$ and $M_{REF2}$ are arranged as stacked transistors that have similar operating characteristics to switching transistor $M_{TSW}$ (see FIG. 7). Current $I_{REF}$ is provided to the stacked transistors ($M_{REF1}$ and $M_{REF2}$) by current source $I_S$, whereby a reference voltage ($V_{REF}$) is generated. The reference circuit is arranged such that changes in processing, operating temperature and other environmental influences are accounted for in the reference voltage.

Dynamic Current Limit with Adjustable Reference Voltage Level

Figure 9:
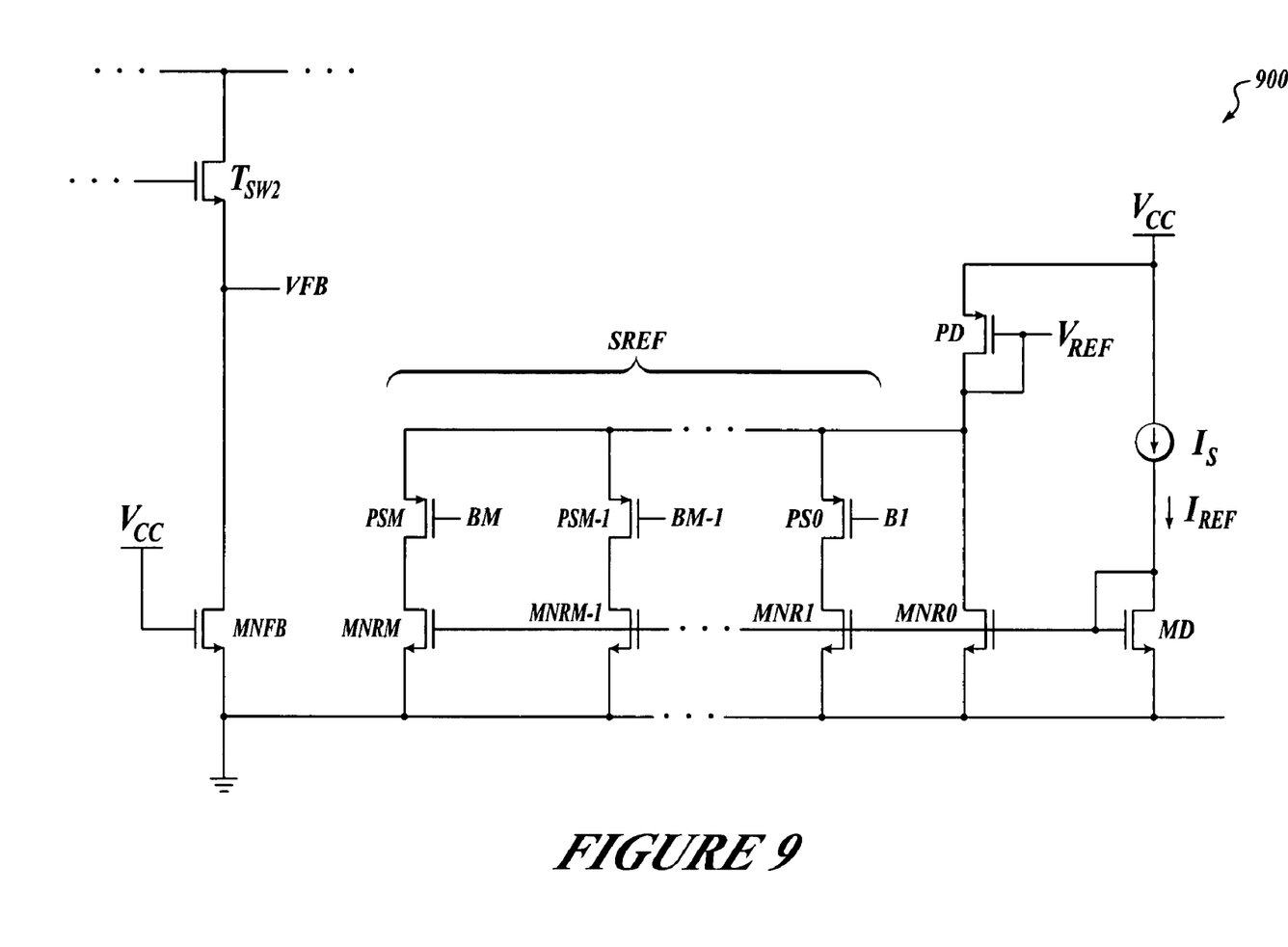
FIG. 9 illustrates an example schematic diagram for a system that employs a second current limit adjustment means, arranged in accordance with aspects of the present invention.

FIG. 9 illustrates an example schematic diagram (900) for a system that employs a second current limit adjustment means, arranged in accordance with at least one aspect of the present invention. System 900 includes a switching transistors ($T_{SW2}$), a resistance circuit ($M_{NFB}$), and a reference circuit (REF) that is illustrated by a nine transistors ($M_{NR0}$–$M_{NRM}$, $M_D$, $P_D$, $P_{S1}$–$P_{SM}$) and a current source (Is).

The system (900) illustrated in FIG. 9 is substantially similar in operation to that is described with respect to FIG. 7, and like components are labeled identically. However, the adjustable resistance circuit RLIM from FIG. 7 is replaced with a fixed resistance value that is illustrated by transistor $M_{NFB}$.

Current source $I_S$ is arranged to couple current $I_{REF}$ to transistor MD, which is configured to operate as a diode. Transistors $M_{NR0}$–$M_{NRM}$ are arranged in a current mirror configuration with transistor MD. Transistor $M_{NR0}$ is coupled to transistor PD, which is configured to operate as a diode. Transistors $M_{NR1}$–$M_{NRM}$ are selectively coupled to transistor PD such that the total operating current for transistor PD can be adjusted in response to control signal $S_{REF}$. For the example illustrated in FIG. 9, control signal $S_{REF}$ is an M-bit signal with bits $B_1$–$B_M$. Since the operating current of transistor $P_D$ is selectable, the overall reference voltage provided as $V_{REF}$ is adjustable.

In an alternative embodiment, the current mirror can provide a fixed current and a number of selectable devices can be placed in parallel with transistor PD to adjust the reference voltage. In yet another alternative embodiment, the value associated with current $I_{REF}$ can be selectable. In still another embodiment, the circuit of FIG. 8 can be combined with the circuit of FIG. 9 to provide adjustments to both the feedback voltage and the reference voltage.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An apparatus for adjusting a current limit in a switching regulator that includes an inductor and a switching circuit that is arranged to provide selective charging of the inductor, the apparatus comprising:
   a measurement circuit that is arranged to provide a measurement signal that is associated with the inductor;
   a switched voltage divider circuit that is arranged to provide a feedback signal that is responsive to changes in a current in the inductor according to a feedback factor;
   a comparator circuit that is arranged to: compare a reference signal to the feedback signal, and assert a limit signal when the current limit is reached as indicated by the feedback signal; and
   a current limit adjustment circuit that is arranged to change the feedback factor in response to the measurement signal such that the current limit is adjusted.

2. The apparatus of claim 1, wherein the measurement signal is associated with at least one of: an inductance value associated with the inductor, a saturation current associated with the inductor, and a slew rate associated with the inductor.

3. The apparatus of claim 1, the measurement circuit comprising an analog-to-digital converter that is arranged to provide digital values that are associated with a measured parameter for the inductor.

4. The apparatus of claim 3, the measurement circuit further comprising: a digital logic circuit that is arranged to process the digital values to calculate at least one of: an inductance value for the inductor, a saturation current for the inductor, a slew rate for the inductor, an average value of the inductance, an average value of the saturation current, an average value of the slew rate, a noise filtered value of the inductance, a noise filtered value of the saturation current, and a noise filtered version of the slew rate.

5. The apparatus of claim 1, the switched voltage divider circuit comprising a transistor that is series coupled to a resistance circuit, wherein the transistor is responsive to a control signal for the switching circuit such that the resistance circuit provides the feedback signal when the transistor is activated.

6. The apparatus of claim 5, wherein the resistance circuit has a resistance value that is adjusted in response to a control signal (SLIM) such that the current limit is adjusted by changes in the resistance value.

7. The apparatus of claim 5, wherein the resistance circuit has a resistance value that is adjusted in response to a control signal (SLIM) such that the current limit is adjusted by changes in the resistance value.

8. The apparatus of claim 5, wherein the resistance circuit comprises a first transistor that is selectively coupled in parallel with a second transistor, wherein an effective impedance is adjusted in response to a control signal (SLIM) such that the current limit is adjusted by changes in the effective impedance.

9. The apparatus of claim 7, wherein at least one of the first and the second transistor further comprises an array of transistors that are selectively coupled in parallel with one another to provide an adjustable impedance.

10. The apparatus of claim 8, wherein each of the array of transistors has a characteristic impedance, and wherein the array of transistors is arranged such that a desired set of impedance values may be selected in response to the control signal (SLIM).

11. The apparatus of claim 1, further comprising at least two transistors and a current source, wherein the at least two transistors are arranged in a stacked configuration that receives a reference current ($I_{REF}$) from the current source to provide the reference signal as a reference voltage ($V_{REF}$).

12. The apparatus of claim 1, further comprising a current source, a current mirror circuit, and a diode circuit, wherein the current mirror circuit is arranged to receive a reference current ($I_{REF}$) from the current source and provide another current to the diode circuit such that the diode circuit provides the reference signal as a reference voltage ($V_{REF}$).

13. The apparatus of claim 1, further comprising a reference circuit that is arranged to provide the reference signal, and wherein the reference circuit is arranged such that the reference signal is responsive to a reference adjustment signal ($S_{REF}$).

14. The apparatus of claim 13, the reference circuit comprising: a current source, a current mirror circuit, and a diode circuit, wherein the current mirror circuit is arranged to receive a reference current ($I_{REF}$) from the current source and provide another current to the diode circuit such that the diode circuit provides the reference signal as a reference voltage ($V_{REF}$).

15. The apparatus of claim 14, wherein the current mirror circuit has a selectable current mirror ratio that is responsive to the reference adjustment signal ($S_{REF}$).

16. An apparatus for adjusting a current limit in a switching regulator that includes an inductor and a switching circuit that is arranged to provide selective charging of the inductor, the apparatus comprising:
- a measurement circuit that is arranged to provide a measurement signal that is associated with the inductor;
- a switched voltage divider circuit that is arranged to provide a feedback signal that is responsive to changes in a current in the inductor according to a feedback factor;
- a comparator circuit that is arranged to: compare a reference signal to the feedback signal, and assert a limit signal when the current limit is reached as indicated by the feedback signal;
- a reference circuit that is arranged to provide a reference signal according to a reference factor; and
- a current limit adjustment circuit that is arranged to change the reference factor in response to the measurement signal such that the current limit is adjusted.

17. The apparatus of claim 16, the reference circuit comprising a current source, a current mirror circuit, and a diode circuit, wherein the current mirror circuit is arranged to receive a reference current ($I_{REF}$) from the current source and provide another current to the diode circuit such that the diode circuit provides the reference signal as a reference voltage ($V_{REF}$).

18. The apparatus of claim 17, wherein the current mirror circuit has a selectable current mirror ratio that is responsive to a reference adjustment signal (SREF).

19. The apparatus of claim 17, wherein at least one of the diode circuit and the current mirror circuit comprises at least two transistor devices that are selectively operated in parallel with one another in response to a reference adjustment signal (SREF) to adjust the reference signal.

20. An apparatus for adjusting a current limit in a switching regulator that includes an inductor and a switching circuit that is arranged to provide selective charging of the inductor, the apparatus comprising:
- a means for measuring that is arranged to provide a measurement signal that is associated with the inductor;
- a switched voltage divider circuit that is arranged to provide a feedback signal that is responsive to changes in a current in the inductor according to a feedback factor;
- a comparator circuit that is arranged to: compare a reference signal to the feedback signal, and assert a limit signal when the current limit is reached as indicated by the feedback signal;
- a reference voltage circuit that is arranged to provide a reference signal; and
- a current limit adjustment means that is arranged to change at least one of the feedback factor and a value associated with the reference signal in response to the measurement signal such that the current limit is adjusted.

\* \* \* \* \*

UNITED STATES PATENT AND TRADEMARK OFFICE
CERTIFICATE OF CORRECTION

| | | |
|---|---|---|
| PATENT NO. | : 6,969,976 B1 | Page 1 of 1 |
| APPLICATION NO. | : 10/861872 | |
| DATED | : November 29, 2005 | |
| INVENTOR(S) | : Michael Eugene Broach et al. | |

It is certified that error appears in the above-identified patent and that said Letters Patent is hereby corrected as shown below:

Column 8,
Lines 26, 30, 35 and 46, "control signal (SLIM)" should read -- control signal ($S_{LIM}$) --.

Column 10,
Lines 3 and 8, "adjustment signal (SREF)" should read -- adjustment signal ($S_{REF}$) --.

Signed and Sealed this

Twentieth Day of June, 2006

JON W. DUDAS
*Director of the United States Patent and Trademark Office*